INVENTOR.
DAVID F. MEADOWS

INVENTOR.
DAVID F. MEADOWS

July 15, 1969

D. F. MEADOWS 3,455,080

PLASTIC EXTRUSIONS, METHODS OF USING THE SAME, AND
STRUCTURES FORMED THEREWITH

Filed Sept. 25, 1964

INVENTOR.
DAVID F. MEADOWS
BY
W. A. Shira, Jr.
ATTY.

United States Patent Office 3,455,080
Patented July 15, 1969

3,455,080
PLASTIC EXTRUSIONS, METHODS OF USING THE SAME, AND STRUCTURES FORMED THEREWITH
David F. Meadows, Whipple, Ohio, assignor to The B. F. Goodrich Company, New York, N.Y., a corporation of New York
Filed Sept. 25, 1964, Ser. No. 399,194
Int. Cl. E06b *3/62, 3/22;* E04f *19/06*
U.S. Cl. 52—476                                       21 Claims This invention relates to plastic extrusions adapted to support panel members, methods of utilizing the extrusions and the structures so produced. More particularly, the invention resides in improved extrusions of plastic material peculiarly adapted for framing panel members or providing joints therebetween, thereby facilitating mounting building panels, providing sealed joints between adjacent panel members and constructing attractive, durable, window sash by any of several easily executed procedures.

Window sash as now constructed, whether those for use as prime windows or those used as storm windows, include a sealing substance between the glass and the frame. The application of this sealing substance, which may be putty, other glazing compound, or a sealing gasket of elastomeric material, requires a considerable amount of labor and frequently does not result in an adequate and durable seal of the glass to the frame. Moreover, prior sash constructions have been such that reglazing has been difficult, if not impossible, or, where attempts have been made to facilitate reglazing, the constructions have been expensive.

The mounting of panels to form either interior or exterior walls of buildings or walls of chests, cabinets and similar structures require panel-framing or supporting members which can be readily applied to the panel members to provide a finished appearance and prevent the entrance of foreign substances between adjacent panels or between the frame members and the panels. The problems encountered in such panel mounting and joint sealing are in many respects similar to those involved in the construction and glazing of window sash.

The principal object of this invention is, therefore, the provision of improved panel-supporting rigid plastic extrusions having flexible plastic sealing material as an integral part thereof, the extrusions being so made that rigid panels of glass or wall-forming material can be supported therein with a minimum of equipment and skill.

Another object of the invention is the provision of an improved joint between adjacent panels.

A further object of the invention is to provide an improved window sash frame member formed of plastic material in a manner such that the sash made therewith may employ either the wrap-around or drop-in glazing methods, the corners of the sash may be either permanently or removably interconnected, either single or double strength glass may be employed, and reglazing may be easily effected.

An additional object of the invention is the provision of improved panel-supporting members in the form of unitary extrusions of rigid and flexible plastic materials such that the panel-receiving portions of the members comprise sidewalls of the rigid plastic material from which integral sealing projections of the flexible plastic material extend along the lengths of the members.

A more specific object of the invention is the provision of improved panel-supporting members, as defined in the preceding paragraph, in which the panel-receiving portions of the extrusions are initially formed of two integrally interconnected parts which are readily separated and subsequently releasably re-engaged with an adjustable spacing therebetween to accommodate panels of different thicknesses permitting window sash made therefrom to be readily glazed or reglazed with single or double strength glass and the glazing operation to be effected without the need of special tools or parts.

The invention further resides in other novel features of the extrusions, of the panel joints, window sash and related structures made with the extrusions, and the methods by which the structures are so made as will hereinafter be evident from the following detailed description of the invention which is illustrated in the accompanying drawings, forming a part of this application, and in which.

Figure 3:
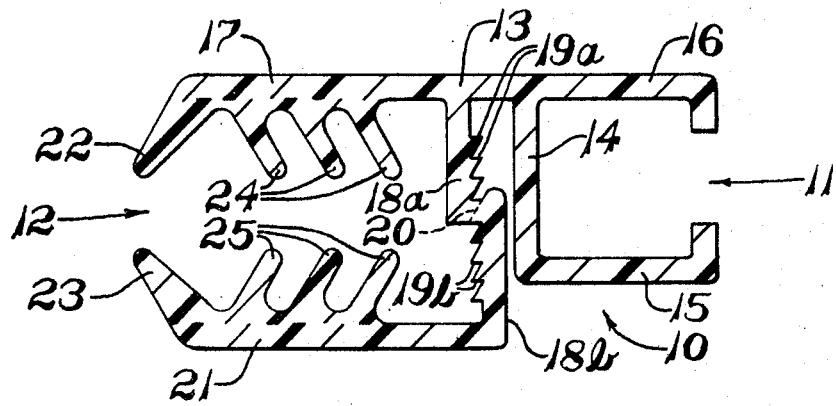
FIG. 3 is an enlarged transverse sectional view of the frame member per se as it is extruded and before it is assembled into a completed sash.

FIG. 3 illustrates in transverse section the presently preferred embodiment of the novel extrusion employed as a window sash frame member in accordance with this invention. As shown therein, the member is initially formed as a unitary extrusion 10 of integrally united rigid and flexible plastic materials which preferably are, respectively, rigid unplasticized polyvinyl chloride and flexible plasticized polyvinyl chloride. The extrusion 10 comprises two channel portions 11 and 12 with their openings oppositely disposed and having one common side 13 from which the base portions of the separate channels extend in spaced generally parallel relationship.

The base portion 14 of the channel 11 is substantially planar and either edge thereof is provided with planar walls 15 and 16, the outer edges of which have integral flanges directed toward each other in spaced relationship. The wall 16 of the channel 11 is an integral portion of the aforementioned wall 13 which forms a common side of both channels 11 and 12 and the portion of wall 13, extending on the opposite side of base 14, forms a portion of walls 17 for channel 12.

The base portion of channel 12 extends in parallel has the region on the side adjacent the base 14 of channel 11 and is formed by two interconnected offset portions 18a and 18b. The portion 18a of the base for channel 12 has the region on the side adjacent the base 14 of channel 11 provided with longitudinally extending teeth-like projections 19a and corresponding teeth-like portions 19b are provided upon the opposite face of the portion 18b of the base for channel 12. The two portions 18a and 18b are interconnected by a frangible web portion 20, intermediate the two sets of teeth-like projections 19a and 19b, which is so made as to readily fracture on an oblique plane. The purpose of this construction will be hereinafter apparent in the subsequent description of the manner in which the extrusion is employed in forming a window sash therefrom.

The base portion 18b of channel 12 merges, in the region remote from the web 20, with an integral sidewall 21 extending at right angles to the base portion 18b and parallel with the sidewall portion 17 which is an integral portion of the common sidewall 13 of the two channels 11 and 12. The portions of the extrusion thus far described are all formed of rigid plastic material.

The outer edges of the walls 17 and 21 for channel 12 are, respectively, provided with integral longitudinally extending projections or lips 22 and 23 which extend obliquely outwardly from the walls with which they are attached and toward the mid-plane of the channel 12. The adjacent sides of the walls 17 and 21, interiorly of the channel 12, are provided with a plurality of inwardly directed longitudinally extending projections or ribs 24 and 25 which are disposed to extend obliquely toward the base of the channel.

The projections comprising the lips 22, 23 and the ribs 24, 25 are each formed of flexible plastic material and are adapted to engage and provide sealing cooperation with a pane of glass when the extrusion is employed as a frame member to form a window sash. These sealing lips and ribs are formed as an integral part of the unitary extrusion by known procedures which may, for example, comprise the use of the two extruders connected with a single die having an opening of appropriate configuration. One such extruder is provided with the plastic material which forms the rigid portions of the extrusion while the other is provided with the material which forms the flexible lips and ribs with these materials being united within the die and issuing as one unitary strip.

Figure 1:
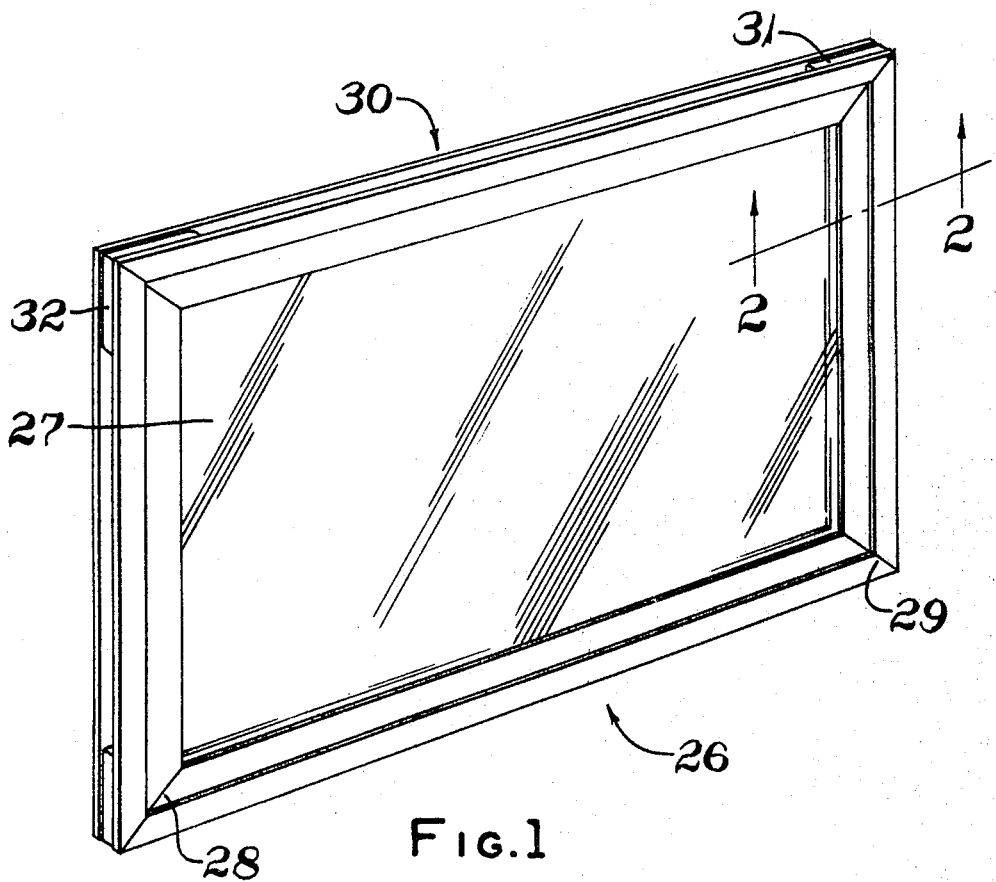
FIG. 1 is a perspective view of an improved window sash made in accordance with this invention.
Figure 2:
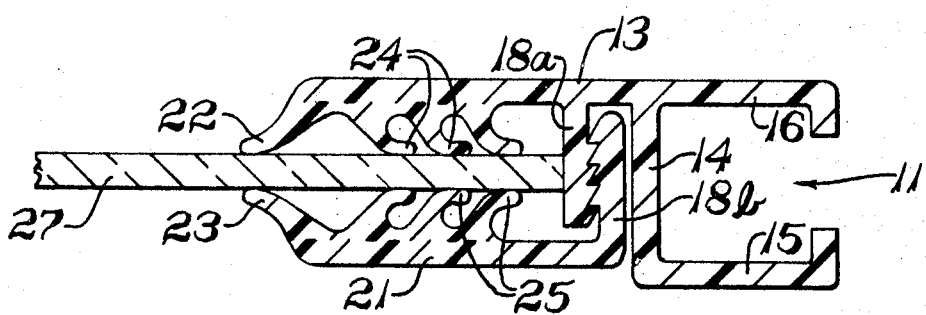
FIG. 2 is a fragmentary transverse sectional view of the window to a larger scale, the section being taken on the section-indicating line 2—2 of FIG. 1.

The extrusion 10 is employed to form the frame members for a window sash 26 by disposing appropriate lengths of the extrusion in a rectangular configuration of desired size with the channel 12 of each side of the sash disposed on the inner periphery thereof for reception of the glass pane 27. The pane is retained in sealed relationship within the channel by rupturing the initial connecting web 20 between the portions 18a and 18b and engaging the teeth-like projections 19a and 19b as shown in FIG. 2. The flexible ribs 24, 25 and sealing lips 22, 23 then resiliently retain the pane of glass within the frame member and provide a seal which prevents entrance of air, water or other fluids.

The plurality of teeth-like projections 19a and 19b provide a means for readily accommodating glass panes 27 of different thicknesses without the need for stocking a variety of extrusions 10 of different sizes or the need for employing separate glazing compounds or gaskets. Furthermore, reglazing is readily effected by exerting pressure upon the wall portion 21 adjacent the lip 23 to rock the teeth 19b from engagement with the teeth 19a whereupon the side 21 of the glass-receiving channel 12 is removed. When the old glass, which may be readily removed, has been replaced by new, the removed portion of channel 12 is replaced by re-engaging the teeth 19b thereon with the teeth 19a through exerting pressure on the wall 21. After the teeth 19a and 19b are thus re-engaged, separation of the two portions of the channel 12 is prevented since the thickness of the pane of glass acts through the resiliency of the sealing lips and ribs to maintain the teeth in firm interlocking engagement.

A window sash 26 formed with a frame constructed from portions of the extrusion 10 may be assembled in accordance with several different procedures. In accordance with one procedure, four mitered end pieces of extrusion 10 in lengths to provide the bottom, sides and top of the sash are selected and three of these are placed in U-shape configuration with their mitered ends in abutment as indicated in the lower portion of FIG. 4. A pane of glass 27 is then inserted in the channel portion 12 of each of the three so disposed frame members. This is possible because the two base portions 18a and 18b of the channel 12 in each frame member are still united by the web 20 so that the sidewalls are spaced sufficiently for ready insertion of the glass. After the glass is placed, pressure exerted on the wall portion 21 of each of the frame members ruptures the web 20 and causes the base portion 18b to be displaced relative to the base portion 18a with interengagement of the teeth 19a, 19b and deformation of the sealing lips 22, 23 and sealing ribs 24, 25 to thereby provide sealing engagement of the frame members with the glass pane. The corners 28, 29 of the sash, represented by the abutted mitered end portions of the frame members, may be united by appropriate means such as heat sealing or the use of appropriate solvents or adhesives.

Figure 4:
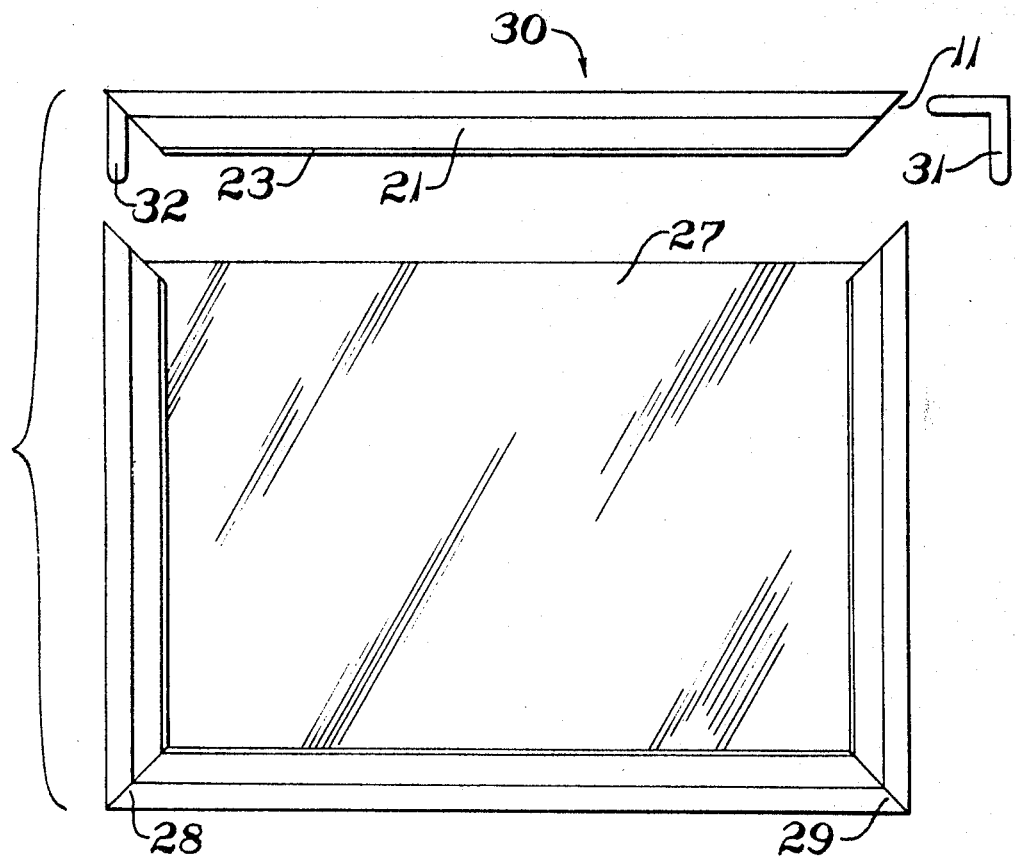
FIG. 4 is a partially exploded view in front elevation illustrating one method of assembling a window sash employing extruded frame members of this invention.

The portion of the extrusion 10 which is to comprise the fourth side 30 of the frame is then provided with right angle splines or keys 31 and 32 which may be formed of suitable rigid plastic material of a dimension which has a frictional fit within the channel 11 of the frame member. One leg of each of the splines or keys 31, 32 is so inserted in the opposite ends of the channel 11 of member 30, as indicated at the left of FIG. 4, and the extending ends of these splines or keys are then inserted in the channels 11 of the frame members forming the sides of the previously assembled U-shape configuration with the exposed edge of the glass pane 27 received in the channel portion 12 of the member 30 which at this time has the connecting web 20 intact. After the frame member 30 has been so positioned upon the edge of the glass 27 with the mitered end portions of the member 30 abutting the adjacent frame members, pressure is exerted on the wall 21 of the member 30 to rupture the web 20 and engage the teeth 19a and 19b so that the sealing lips 22, 23 and sealing ribs 24, 25 engage the glass pane 27 in sealing relationship. The window sash as so constructed is then ready for use.

Reglazing of a window sash, constructed as just described, can be readily effected by withdrawing the member 30 from the glass and the other frame members by exerting a pull upon the member 30 thus withdrawing the splines 31 and 32 from the channels in the frame portions extending at right angles to the member 30. After the member 30 has been so displaced, the old pane of glass may be slid from the channels 12 in the frame members which remain in the U configuration, as shown in the lower part of FIG. 4. A new pane of glass is then slid into place whereupon the member 30 is returned to its initial position by re-engaging the splines 31 and 32 with the adjacent frame members. If desired, the removal and replacement of the glass may be facilitated by first disengaging the teeth 19a and 19b of each frame member and removing the side 21 of the frame member. After the glass is replaced the side members 21 can be restored to their proper positions by re-engaging the teeth 19a, 19b.

A second method of employing an extrusion of the type illustrated in FIG. 3 for assembly of a window sash is to provide four appropriate lengths of the extrusion with mitered ends and sequentially engage each of these over one edge of a pane of glass of size selected in accordance with the sizes of the frame members. During this operation the connecting web 20 of each frame member remains intact. With the frame members thus disposed upon the glass the connecting web 20 of each frame member is then ruptured by pressure exerted upon the sidewall 21 and the corners of the frame members are united by heat, solvent or adhesive. Alternatively, the corners of the frame members may be connected by splines 31, 32 by inserting these in the channel members as the separate frame members are being sequentially disposed about the glass panel.

Another method by which window sash may be constructed employing the extrusion of this invention comprises providing four portions of the extrusion in appropriate lengths for the sash to be constructed, mitering the ends of these pieces, rupturing the connecting web 20 of each said portion and removing the walls 21. The four remaining portions of the extrusion are then arranged in rectangular configuration with sidewalls 13 coplanar whereupon the corners are secured together by any suitable means. A pane of glass is next laid upon the flexible ribs 24 and sealing lips 22 of the thus united members and the separated walls 21 of those members are restored so that the teeth 19b of each interengage with the teeth 19a on the companion portion of the frame member from which the side had been initially separated. Reglazing of a window formed in this manner may be readily effected by simply removing the channel sides 21 of the sash thus exposing the edges of the pane of glass which can be removed and replaced after which the separable channel sides of the frame members are returned to their sealing relationship with the glass by re-engaging the cooperating teeth.

The extrusion 10 has been described in detail with respect to its utilization in windows. It will be evident, however, that panels of material other than glass can be framed by the heretofore described extrusion 10 or by extrusions of other configurations embodying the principles of this invention. Moreover, the novel extrusions can be so made as to facilitate joining adjacent panels such as are employed for interiors and exteriors of buildings, walls of refrigerators and other cabinets. An extrusion adapted for such uses is illustrated in FIG. 5 and the manner in which it is utilized to join two adjacent panels is shown in FIG. 6.

Figure 5:
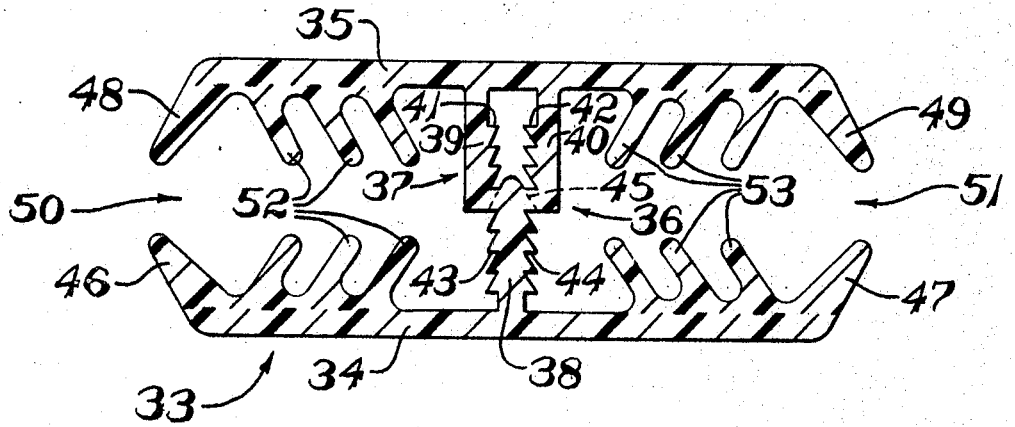
FIG. 5 is an enlarged transverse sectional view of another extrusion made in accordance with the invention.
Figure 6:
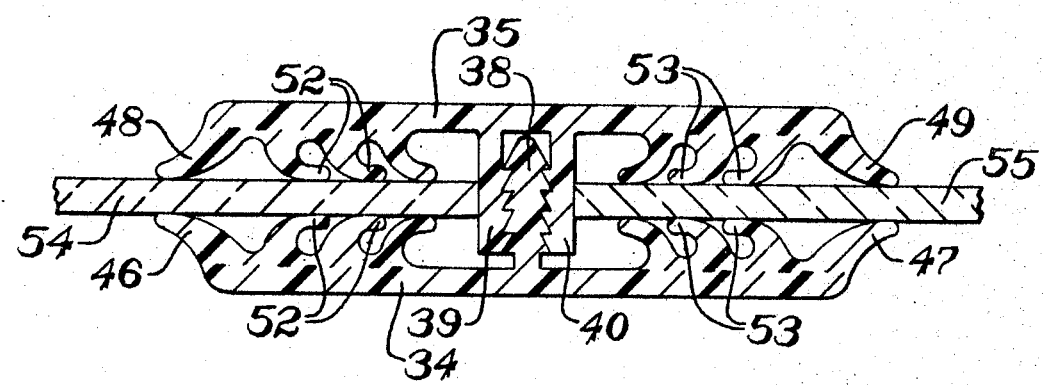
FIG. 6 is an enlarged fragmentary transverse sectional view of an extrusion of the type illustrated in FIG. 5 as it is employed to join two panel members.

The extrusion 33 illustrated in FIG. 5 comprises a pair of elongated walls 34 and 35 extending in parallel, spaced relation and initially united by a transverse wall portion 36 intermediate the edges of the walls 34 and 35. The walls 34, 35 and 36 are all formed integral of rigid plastic material, such as polyvinyl chloride, with the wall 36 formed in two parts 37 and 38 which are connected by a frangible web which may be readily fractured to dispose the two parts 37 and 38 of the wall in overlapping relationship in which they are retained by cooperating interlocking surfaces. As here shown, the portion 37 of wall 36 is formed by two spaced integral projections 39 and 40 on the inner face of wall 35 with the inner sides of the projections provided with teeth-like surfaces 41 and 42. The portion 38 of wall 36 is an integral projection from the inner side of wall 34 and has the outer sides provided with teeth-like projections 43 and 44. The frangible connection 45 between the two parts 37 and 38 of wall 36 is provided along oppositely inclined planes in the web connecting those parts and is so positioned that, upon fracture, the planes form part of the teeth-like surfaces. The provision of such a frangible connection can be effected by known extruding procedures.

The outer edges of the walls 34 and 35 of the extrusion are provided with integral longitudinally extending projections or lips 46, 47, 48, 49 which extend obliquely outwardly from the walls with which they are attached and toward the mid-plane of the oppositely directed channels 50 and 51 provided in the extrusion. The adjacent sides of the walls 34 and 35, interiorly of the channels 50 and 51, are provided with a plurality of inwardly directed longitudinally extending projections or ribs 52 and 53 which are disposed to extend obliquely toward the base of the channel in which the ribs are located.

The projections comprising the lips 46–49 and the ribs 52, 53 are each formed of flexible plastic material and are adapted to engage and provide sealing cooperation with the adjacent edges of spaced, proximate panels. These sealing lips and ribs are formed as an integral part of the unitary extrusion by known procedures which may, for example, comprise the use of two extruders connected with a single die having an opening of appropriate configuration. One such extruder is provided with the plastic material which forms the rigid portions of the extrusion while the other is provided with the material which forms the flexible lips and ribs with these materials being united within the die and issuing as one unitary strip.

The extrusion 33 is employed as illustrated in FIG. 6 to form a sealed joint between two panel members 54 and 55, which may be interior or exterior wall panels of a building, cabinet or other structure. The procedure is simple and requires no special tools or sealing materials.

An appropriate length of the extrusion 33 is placed between the two panels with each received in one of the channels 50 and 51. The joint is completed by rupturing the initial connecting web 45 between the portions 37 and 38 and engaging the teeth-like surfaces 41 and 42 with the teeth-like surfaces 43 and 44 which are now disposed as shown in FIG. 6. The flexible ribs 52, 53 and sealing lips 46–49 then resiliently retain the panels 54 and 55 in place and provide a seal which prevents entrance of air, water, or other fluids. The plurality of teeth-like surfaces 41–44 provide a means for readily accommodating panels of different thicknesses without the need for stocking a variety of extrusions 33 of different sizes or the need for employing separate glazing compounds or gaskets.

The invention has been described with specific reference to the use of plasticized polyvinyl chloride for the sealing lips and ribs and rigid unplasticized polyvinyl chloride for the other portions of the extrusions. It will be apparent, however, that the principles of this invention can be employed with other materials so long as the materials employed for the flexible portions of the extrusions are compatible with the materials employed for those portions of the extrusions which are rigid. Furthermore, the specific shape of the channel portion 11 of the extrusion 10 is not critical and may be varied in accordance with the nature of the sash constructions desired and the methods to be employed in their fabrication. In fact, it is possible to employ the principles of this invention without utilizing a channel configuration about the exterior periphery of the sash. Also, the shape and number of the sealing ribs, the angularity of these and of the sealing lips for both the illustrated extrusions, as well as other changes in their configurations and the mode of assembling these into completed structures may be varied from those herein illustrated and described. Hence, the invention is not to be considered as limited to the specifically disclosed embodiments or the specifically suggested variations except as may be required by the spirit and scope of the appended claims.

Having thus described the invention, I claim:

1. An extrusion of the type described comprising a channel formed of rigid plastic material with plastic sealing projections formed of material more flexible than the material of said channel on the sidewalls of the channel extending obliquely toward each other and integrally united with the rigid plastic material of the channel, the base of said channel comprising two longitudinally integrally connected readily separable parts one of which has its inner face provided with longitudinally extending teeth-like projections and the outer face of the other part of said channel base being provided with cooperating teeth-like projections, said channel being longitudinally separable lengthwise between the two said parts of the base portion and the said teeth-like projections on each of the said two parts thereafter being interengageable to provide a panel-receiving channel of adjustable width.

2. An extrusion of the type described comprising a channel formed of rigid plastic material with a plurality of plastic sealing ribs formed of material more flexible than the material of said channel extending longitudinally within the channel on the inner sidewalls thereof and integrally united with the rigid plastic material of the channel and with an integral flexible plastic sealing lip on the outer edge of each rigid sidewall of the channel, the base of said channel comprising two longitudinally integrally connected readily separable parts one of which has its inner face provided with longitudinally extending teeth-like projections and the outer face of the other part of said channel base being provided with cooperating teeth-like projections, said channel being longitudinally separable lengthwise between the two said parts of the base portion and the said teeth-like projections on each of the said two parts thereafter being interengaged to provide a panel-receiving channel of adjustable width.

3. An extrusion for use in making a window sash, comprising an elongated member of rigid plastic material in the form of two oppositely directed channels having one common side from which base portions of the separate channels extend in spaced generally parallel relationship separated from each other a distance in the order of the thickness of one of the base portions, the base portion of one of said channels being formed of two portions integrally connected by a frangible section for separation of the two portions lengthwise thereof into two separate portions each of which has teeth-like projections adapted to interengage when the separated portions are repositioned in overlapping relationship with one repositioned portion positioned in the said separated space, the sidewalls of the channel having the separable base portions being provided with longitudinally extending panel engaging sealing projections of plastic material more flexible than that of the material of the channel and integrally united with the said rigid material of the channel.

4. An extrusion of the type described comprising spaced parallel walls of rigid plastic material, a transverse wall portion of rigid plastic material intermediate the opposite edges of the parallel walls formed integrally therewith and dividing the extrusion into two oppositely facing channels, flexible plastic sealing projections on and integral with the sidewalls of both channels with the projections extending obliquely toward each other and longitudinally of the channels, the said intermediate wall portion being formed of two initially connected portions each integral at one end with one of the parallel walls and extending approximately one-half the distance therefrom toward the other of sadi parallel walls with the said two portions integrally connected adjacent their inner edges by a common readily frangible region, the said two portions being adapted to be disposed in overlapping relationship after rupture of said frangible region, and cooperating interlocking surfaces on the adjacent sides of the said two portions.

5. An exrusion as defined in claim 4 wherein at least one of two portions of the said intermediate wall comprises a pair of parallel spaced walls adapted to receive therebetween the other of said two portions, and the said interlocking surfaces are interengaging teeth-like projections on adjacent sides of the said two portions.

6. A one-piece extrusion of the type described comprising an elongated channel generally U-shaped in cross section formed of rigid plastic material with panel-engaging flexible sealing projections on the sidewalls with the said projections separate from each other and each individually integral with the rigid material of the said sidewalls.

7. A one-piece extrusion of the type described comprising an alongated channel generally U-shaped in cross section formed of rigid plastic material with a plurality of panel-engaging flexible sealing ribs extending longitudinally within the channel on the inner sidewalls thereof and obliquely toward the base of the channel, and a panel-engaging flexible sealing lip on the outer edge of each rigid sidewall of the channel extending externally of the channel and obliquely toward the mid-plane of the latter, the said sealing ribs and sealing lips being formed of a plastic material more flexible than the material of the sidewalls with the said ribs and lips separate from each other and each individually integral with the material of one of said sidewalls.

8. A one-piece extrusion of the type described in claim 7 wherein the said channel sidewalls are unplasticized polyvinyl chloride and the said flexible sealing ribs and lips are plasticized polyvinyl chloride.

8. A one-piece extrusion of the type described in claim 7 wherein the said channel sidewalls are unplasticized polyvinyl chloride and the said flexible sealing ribs and lips are plasticized polyvinyl chloride.

9. A sealing support for a rigid panel comprising a rectangular frame each side of which is a length of an extrusion as defined in claim 7, the ends of said lengths being mitered and united together with the said channel on the inner periphery of the frame.

10. A window sash comprising a rectangular frame with a glass-receiving channel on its inner periphery wherein each side of said frame is a length of an extrusion as defined in claim 7, the ends of said lengths being mitered and united together with at least one side of said frame separable from the two adjacent sides, and means for releasably securing the said separable side to the said adjacent sides.

11. A window sash as defined in claim 10 wherein said frame has a channel extending about the entire exterior periphery thereof and the said means for releasably securing the separable side to the adjacent sides comprise a pair of right-angle rigid splines receivable in the said exterior channel at those corners of the frame of which the ends of said separable side form a part.

12. A one-piece extrusion of the type described comprising spaced parallel sidewalls of rigid plastic material, a transverse wall portion of rigid plastic material intermediate the opposite edges of the sidewalls formed integrally therewith and dividing the extrusion into two oppositely facing channels, and flexible sealing projections on and integral with the rigid sidewalls of both channels, the said projections being formed of plastic material more flexible than the material of said sidewalls with the said projections separate from each other and each individually integral with the rigid material of one of said sidewalls, the said flexible projections extending obliquely toward each other and longitudinally of the channels.

13. A sealing support for a rigid panel comprising a rectangular frame each side of which is a length of an extrusion as defined in claim 6, the ends of said lengths being mitered and united together with the said channel on the inner periphery of the frame.

14. A sealing support as defined in claim 13 wherein the rigid plastic material is unplasticized polyvinyl chloride and the sealing projections are formed of plasticized polyvinyl chloride.

15. A joint between the adjacent edges of two proximate rigid panel members comprising a first elongated strip formed of rigid plastic material overlying the marginal regions adjacent the proximate edges on one side of the two panel members, integral flexible projections on the face of said strip adjacent said panel members, which projections are formed of plastic material more flexible than that of said strip, an integral projection of rigid plastic material on said strip extending between the spaced edges of the panel members, a second elongated strip formed of rigid plastic material overlying the marginal regions adjacent the proximate edges on the other side of the panel members, integral flexible projections on that face of the said second strip adjacent the panel members, which projections are formed of plastic material more flexible than that of said strips, an integral projection of rigid plastic material on the said second strip extending between the spaced edges of said panel members in overlapping relationship with the said projection of rigid material on the first strip, and cooperating interlocking surfaces on the said projections of rigid material of the first and second strips holding the strips in flexible-projection deforming relationship with the panel members.

16 A sealed joint between the adjacent edges of two proximate rigid panel members comprising a first elongated strip formed of rigid plastic overlying the marginal regions adjacent the proximate edges on one side of the two panel members, integral flexible sealing ribs on the face of said strip adjacent said panel members, which ribs are formed of plastic material more flexible than that of said strip, an integral projection of rigid plastic material on said strip extending between the spaced edges of the panel members, a second elongated strip of rigid plastic material overlying the marginal regions adjacent the proximate edges on the other side of the panel members, integral flexible sealing ribs on that face of the said second strip adjacent the panel members, which ribs are formed of plastic material more flexible than that of said strips, an integral projection of rigid plastic material on the said second strip extending between the spaced edges of said panel members in overlapping relationship with the said projection of rigid material on the first strip, and interengaging teeth-like projections on the said projections of rigid material of the first and second strips holding the strips in sealing rib deforming relationship with the panel members.

17. The method of making a window sash comprising: providing an extruded elongated member of rigid plastic material in the form of a generally U-shaped channel the base portion of which is formed of two portions integrally connected by a frangible section for separation lengthwise thereof into two separate portions each of which has teeth-like projections adapted to interengage when the portions are separated and disposed in overlapping relationship, and the sides of said channel being provided with longitudinally extending glass engaging sealing projections of plastic material more flexible than that of said channel and integrally united with the rigid material of the channel; cutting said extrusion into mitered lengths suitable for providing the four sides of a window sash; providing a pane of glass; inserting one edge of the said pane within the channel of each of said lengths until the mitered ends of the lengths are in engagement; pressing inwardly on one sidewall of each length of channel to rupture the connection thereof to the opposite sidewall and interengage the teeth on the adjacent base portions; and uniting the ends of the said lengths at the corners of the sash.

18. The method of making a window sash comprising: providing an elongated extruded member of rigid plastic material in the form of two oppositely directed channels having one common side from which base portions of the separate channels extend in adjacent generally parallel relationship spaced from each other a distance in the order of the thickness of one of the base portions, the base portion of one of said channels being formed of two portions integrally connected by a frangible section for separation lengthwise thereof into two separate portions one of which remains integral with said common side, the two separate portions each having teeth-like projections located for interengagement when the separated portions are positioned in overlapping relationship with the removed portion adjacent the unitary base portion and between the spaced base portions, and the inner sides of that channel having the separable base portions provided with longitudinally extending glass-engaging sealing projections of plastic material more flexible than that of said channels and integrally united with the rigid material of the latter; cutting said member into mitered end lengths suitable for providing the four sides of a window sash; separating the two portions of the said separable channel of each cut length of the member; uniting into a rectangular configuration those portions of the said cut lengths having the said one common side with that side lying in a common plane and with the glass-engaging projections disposed uppermost and adjacent the inner periphery; placing a pane of glass in contact with the flexible projections on the united portions; and interengaging the teeth on the removed portions of each cut length with the teeth on the other portion of that cut length and with the sealing projections on said removed portion in sealing cooperation with the pane of glass.

19. The method of making a window sash comprising: providing an elongated extruded member of rigid plastic in the form of two oppositely directed channels having one common side from which base portions of the separate channels extend in adjacent generally parallel relationship spaced from each other a distance in the order of the thickness of one of the base portions, the base formed of one of said channels being formed of two portions integrally connected by a frangible section for separation lengthwise thereof into two separate portions one of which remains integral with said common side, the two separate portions each having teeth-like projections located for interengagement when the separated portions are positioned in overlapping relationship with the removed portion adjacent the unitary base portion and between the spaced base portions, and the inner sides of that channel having the separable base portions provided with longitudinally extending glass-engaging sealing projections of plastic material more flexible than that of said channels and integrally united with the material of the latter; cutting said member into mitered end lengths suitable for providing the four sides of a window sash; uniting three of the mitered lengths into a U-shaped configuration with the said one common side of each lying in a common plane and with the separable channel extending about the inner periphery; placing a pane of glass in the interior channel of the lengths which are united in the U-shaped configuration; pressing inwardly on the sidewall of the interior channel of the three lengths comprising the U-shaped configuration to rupture the connection thereof to the opposite sidewall and interengage the teeth on the adjacent base portion of those lengths while placing the said flexible projections in sealing cooperation with the pane of glass; applying the fourth length of the member to the exposed edge of the pane of glass; removably securing the ends of said fourth length of the member to the adjacent ends of the U-shaped configuration; and interengaging the teeth on the two separable base portions of the said fourth length of the member thereby placing the flexible projections thereof in sealing cooperation with the pane of glass.

20. A panel-framing strip of integral, one-piece extruded plastic composition and consisting of an elongated, rigid body section having longitudinally coextensive, relatively spaced apart, substantially inflexible side walls defining a rigid open channel for the reception of an edge portion of a panel, said side walls being formed with integral, longitudinally coextensive, resiliently flexible, barb-like ribs projecting diagonally inwardly of said channel in relatively opposed relationship and arranged to frictionally and sealingly engage the edge portion of a panel received in said channel, said ribs being of substantially softer composition than said body section.

21. A panel-framing strip as defined in claim 20, wherein said body section includes a longitudinally coextensive, hollow, box-like edge portion opposite said channel.

References Cited

UNITED STATES PATENTS

| | | | |
|---|---|---|---|
| 1,391,602 | 9/1921 | Abrason | 51—656 |
| 3,070,197 | 12/1962 | Musselman | 52—656 |
| 2,277,615 | 3/1942 | Townsend | 129—155 |
| 3,204,324 | 9/1965 | Nilsen | 29—155 |
| 2,304,423 | 12/1942 | Schiller | 56—628 |
| 2,840,416 | 6/1958 | Woodward | 49—441 |
| 2,947,391 | 8/1960 | Wayne | 52—627 |
| 3,100,917 | 8/1963 | Wagner | 52—309 |
| 3,256,641 | 6/1966 | Johnson | 52—309 X |
| 3,276,167 | 10/1966 | Bus et al. | 49—485 |

FOREIGN PATENTS

| | | |
|---|---|---|
| 464,290 | 6/1951 | Italy. |
| 1,252,603 | 12/1960 | France. |

FRANCIS K. ZUGEL, Primary Examiner

U.S. Cl. X.R.

52—403, 628, 716

UNITED STATES PATENT OFFICE
CERTIFICATE OF CORRECTION

Patent No. 3,455,080                                                                             July 15, 1969

David F. Meadows

It is certified that error appears in the above identified patent and that said Letters Patent are hereby corrected as shown below:

Column 2, line 53, cancel "has the region on the side adjacent" and insert -- spaced relationship with respect to --. Column 7, line 1, "interengaged" should read -- interengageable --; line 34, "sadi" should read -- said --; line 50, after "sidewalls" insert -- of the channel extending obliquely toward each other and longitudinally of the channel, the said projections being formed of a plastic material more flexible than the materia of the sidewalls --; line 55, "alongated" should read -- elongated --; lines 72 to 75, cancel beginning with "8. A one-piece" to and including "chloride" Column 8, line 69, after "plastic" insert -- material --. Column 10, line 4, "formed", first occurrence, should read -- portion --; line 57, "Abrason" should read -- Abramson --; same line 57, "51" should read -- 52 --; line 59, "129" should read -- 29 --; line 61, "56" should read -- 52 --.

Signed and sealed this 14th day of April 1970.

(SEAL)
Attest:

EDWARD M. FLETCHER, JR.                                            WILLIAM E. SCHUYLER, JR
Attesting Officer                                                       Commissioner of Patents